United States Patent
Miller et al.

(10) Patent No.: US 9,079,525 B1
(45) Date of Patent: Jul. 14, 2015

(54) CARGO BARRIER FOR A VEHICLE

(71) Applicants: David Lee Miller, Greenwood, MO (US); Teresa Lynn Miller, Bates City, MO (US); Jeffrey Lynn Massey, Trimble, MO (US)

(72) Inventors: David Lee Miller, Greenwood, MO (US); Teresa Lynn Miller, Bates City, MO (US); Jeffrey Lynn Massey, Trimble, MO (US)

(73) Assignee: QRF LLC, Lone Jack, MO (US)

( * ) Notice: Subject to any disclaimer, the term of this patent is extended or adjusted under 35 U.S.C. 154(b) by 0 days.

(21) Appl. No.: 14/162,576

(22) Filed: Jan. 23, 2014

(51) Int. Cl.
*B60P 7/08* (2006.01)
*B60P 7/14* (2006.01)

(52) U.S. Cl.
CPC .................................... *B60P 7/14* (2013.01)

(58) Field of Classification Search
CPC ..... B60P 7/14; B60R 21/06; B60R 2021/022; B60R 21/026
USPC ................. 410/118, 121, 129, 140, 130, 141; 296/24.43; 280/749
See application file for complete search history.

(56) References Cited

U.S. PATENT DOCUMENTS 6,616,389 B1 * 9/2003 Ament et al. ................. 410/118

* cited by examiner

*Primary Examiner* — Stephen Gordon
(74) *Attorney, Agent, or Firm* — Mashburn Law Office, LLC; Donna Denise Mashburn (57) ABSTRACT

A cargo barrier for use in a vehicle, the cargo barrier broadly comprising a cargo guard, a guard frame, an elongated connector member, left and right seat mounting brackets, left and right lower extension legs, and left and right lower mounting brackets for mounting the cargo barrier in a first configuration in which the passenger seats are lowered and a second configuration in which the passenger seats are in an upright position.

19 Claims, 7 Drawing Sheets

CARGO BARRIER FOR A VEHICLE

CROSS REFERENCES TO RELATED APPLICATIONS

Applicant claims priority under 35 U.S.C. §119(e) to provisional application No. 61/831,280 filed on Jun. 5, 2013.

BACKGROUND

Embodiments of the present invention generally relate to cargo barriers for use in a vehicle.

Cargo barriers are used in vehicles to prevent cargo from entering the passenger and driver areas of the vehicles. A conventional cargo barrier includes a vertical metal or plastic guard, a guard frame, and two or more mounts for connecting the guard frame to mounting points in the vehicle. The guard frame and the mounts are generally rigidly constructed for being able to withstand large cargo forces, but the rigid construction allows the cargo barrier to be used in only one configuration and in only one vehicle model.

SUMMARY

A cargo barrier constructed in accordance with embodiments of the present invention is illustrated. The cargo barrier broadly comprises a vertical guard, a guard frame, left and right seat mounting brackets, left and right lower extension legs, and left and right lower mounting brackets. The cargo barrier is configured to be mounted in the vehicle in full cargo and full passenger configurations. The cargo barrier is configured to be mounted directly behind the driver and the front passenger seats with the rear passenger seats folded forward and down and the lower corners of the guard frame are connected to seatbelt mounting points on the top left and right of the rear passenger seats (which are positioned at the front of the floor of the cargo area in the full cargo configuration) via the left and right seat mounting brackets in the full cargo configuration. The left and right lower extension legs are connected to the guard frame, extending rearward and connecting to mounting points in the subfloor of the cargo area via the left and right lower mounting brackets in the full cargo configuration.

The cargo barrier is configured to be mounted directly behind the rear passenger seats with the rear passenger seats in their upright positions in the full passenger configuration. The upper corners of the gate frame are connected to the seatbelt mounting points on the top left and right of the passenger seats (which are located at shoulder positions on the passenger seats in the full passenger configuration) via the left and right seat mounting brackets. The lower corners of the gate frame are connected to the mounting points in the subfloor of the cargo area via the left and right lower mounting brackets. The left and right lower extension legs are unused and stored in a convenient location when the cargo barrier is mounted to the vehicle in the full passenger configuration.

This summary is provided to introduce a selection of concepts in a simplified form that are further described in the detailed description below. The summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning now to the drawing figures, and particularly FIGS. 1-4, a cargo barrier 10 for use in a vehicle is illustrated. The cargo barrier 10 broadly comprises a cargo guard 12, a guard frame 14, an elongated connector member 16, left and right seat mounting brackets 18a,b, left and right lower extension legs 20a,b, and left and right lower mounting brackets 22a,b. The cargo barrier 10 also includes a plurality of fasteners for connecting various components together, as described below.

The cargo guard 12 is a substantially vertically extending grate, fence, net, mesh, wall, or other similar structure. The cargo guard 12 may be made of metal, plastic, wood, or other rigid material or may be made of wire, rope netting, mesh material, or similar material that provides sufficient strength when supported. The cargo guard 12 may be approximately 3 feet to approximately 5 feet wide and may be approximately 2 feet to approximately 4 feet tall and may be shaped to fit a specific model or style of vehicle such as a Ford Escape or an SUV. The cargo guard 12 may define a plurality of holes or spaces for reducing its weight and may be substantially see-through for providing rearward visibility to the driver of the vehicle.

The guard frame 14 is made of metal, plastic, wood, or other rigid material and generally conforms to outer extents of the cargo guard 12. The guard frame 14 may be welded or bolted to the cargo guard 12 or the guard frame 14 may hold the cargo guard 12 in tension in the case of the cargo guard 12 being formed of netting or mesh material. The guard frame 14 may have at least two curved portions with an inside radius of at least 2 inches for fitting the cargo barrier 10 into the vehicle and conforming to inner contours of the vehicle. The guard frame 14 includes left and right upper mounting bosses 24a,b, left and right middle mounting bosses 26a,b, and left and right lower mounting bosses 28a,b. The upper and lower mounting bosses 24a,b, 28a,b may be tabs or flanges attached to and/or extending from the guard frame 14 and may define slots or holes for inserting a fastener therethrough. Alternatively, the upper and lower mounting bosses 24a,b 28a,b may be attached to the cargo guard 12. The middle mounting bosses 26a,b may be tabs, flanges, or threaded holes for receiving a threaded fastener therein and may extend into the guard frame 14 from front, back, inside, or outer surfaces of the guard frame 14.

The elongated connector member 16 is made of metal, plastic, wood, or other rigid material and is a substantially straight and substantially horizontally extending rod, bar, or similar member. The elongated connector member 16 includes a first set of left and right mounting bosses 30a,b spaced to align with the left and right lower mounting bosses 28a,b of the guard frame 14, a second set of left and right mounting bosses 32a,b spaced to align with the left and right upper mounting bosses 24a,b of the guard frame 14, and a third set of left and right mounting bosses 34a,b spaced to align with mounting bosses of the left and right seat mounting brackets 18a,b, described below. The first and the second sets of mounting bosses 30a,b, 32a,b may define threaded holes for receiving threaded fasteners therein and may extend into the elongated connector member 16 from front, back upper, or lower surfaces of the elongated connector member 16. The third set of mounting bosses 34a,b may be tabs or flanges extending from or near ends of the elongated connector member 16 and may define holes or slots for receiving fasteners therethrough.

The left and right seat mounting brackets 18a,b include seat mounting bosses 36a,b, respectively, and left and right connector mounting bosses 38a,b, respectively. The seat mounting bosses 36a,b may define holes or slots configured to be aligned with holes of a seatbelt guide mounting point 100 of a rear seat 102 for receiving one or more fasteners therethrough (shown in detail in FIGS. 5-7). The seat mounting bosses 36a,b are shaped for being connected between the seatbelt guide mounting points 100 and seatbelt guides 104 of the rear passenger seats 102 via a single set of fasteners each. The connector mounting bosses 38a,b may also define holes or slots for receiving a fastener therethrough. Each seatbelt guide mounting point 100 is a metal boss at the top of one of the rear seats 102 and includes holes and slots useful for inserting or aligning portions of the seat mounting bosses 36a,b.

The left and right lower extension legs 20a,b are made of metal, plastic, wood, or other rigid material and include a substantially vertical portion 40a,b and a substantially rearward extending horizontal portion 42a,b. The vertical portion 40a,b includes mounting bosses 44a,b attached near a distal end of the vertical portion 40a,b and the horizontal portion 42a,b includes mounting bosses 46a,b attached near a distal end of the horizontal portion 42a,b. The mounting bosses 44a,b and 46a,b may define slots or holes for inserting a fastener therethrough. The left and right lower extension legs 20a,b may include gradually curving middle portions between the vertical portion 40a,b and the horizontal portion 42a,b having an inside radius of at least 2 inches for increasing structural rigidity of the extension legs 20a,b. Alternatively, the extension legs 20a,b may form a triangular or reinforced shape for increasing their structural rigidity.

The left and right lower mounting brackets 22a,b are made of metal, plastic, wood, or other rigid material and are shaped to extend from a floor level of the cargo area of the vehicle down to sub-floor mounting points. The left and right lower mounting brackets 22a,b include upper mounting bosses 48a,b, respectively, and lower mounting bosses 50a,b, respectively. The mounting bosses 48a,b and 50a,b may define slots or holes for inserting a fastener therethrough.

The fasteners for connecting the above components may be bolts, screws, clamps, clips, pins, threaded shafts with knob heads having contours or protrusions for hand tightening, or any other device for connecting two components together.

The above-described cargo barrier 10 provides several advantages over conventional cargo barriers. For example, the cargo barrier 10 may be used in a vehicle in a full cargo configuration and a full passenger configuration. This is achieved due at least in part to the unique seat mounting brackets 18a,b being mountable to the seatbelt guide mounting points 100 of the rear seats 102 (as best shown ins FIG. 5-7). The cargo barrier 10 may also be easily shifted between configurations and may be easily dismantled.

Figure 1:
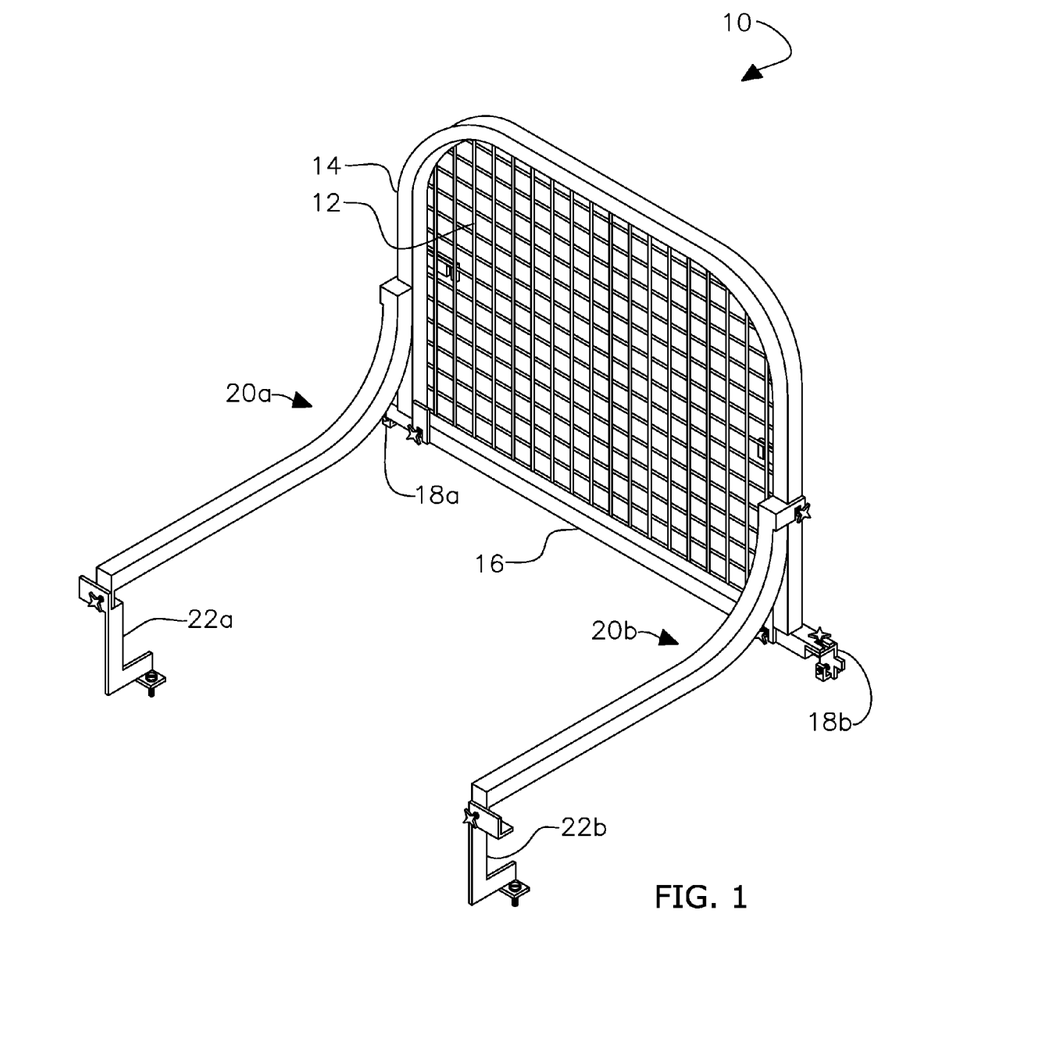
FIG. 1 is a perspective view of a cargo barrier constructed in accordance with an embodiment of the present invention and assembled in a full cargo configuration.
Figure 2:
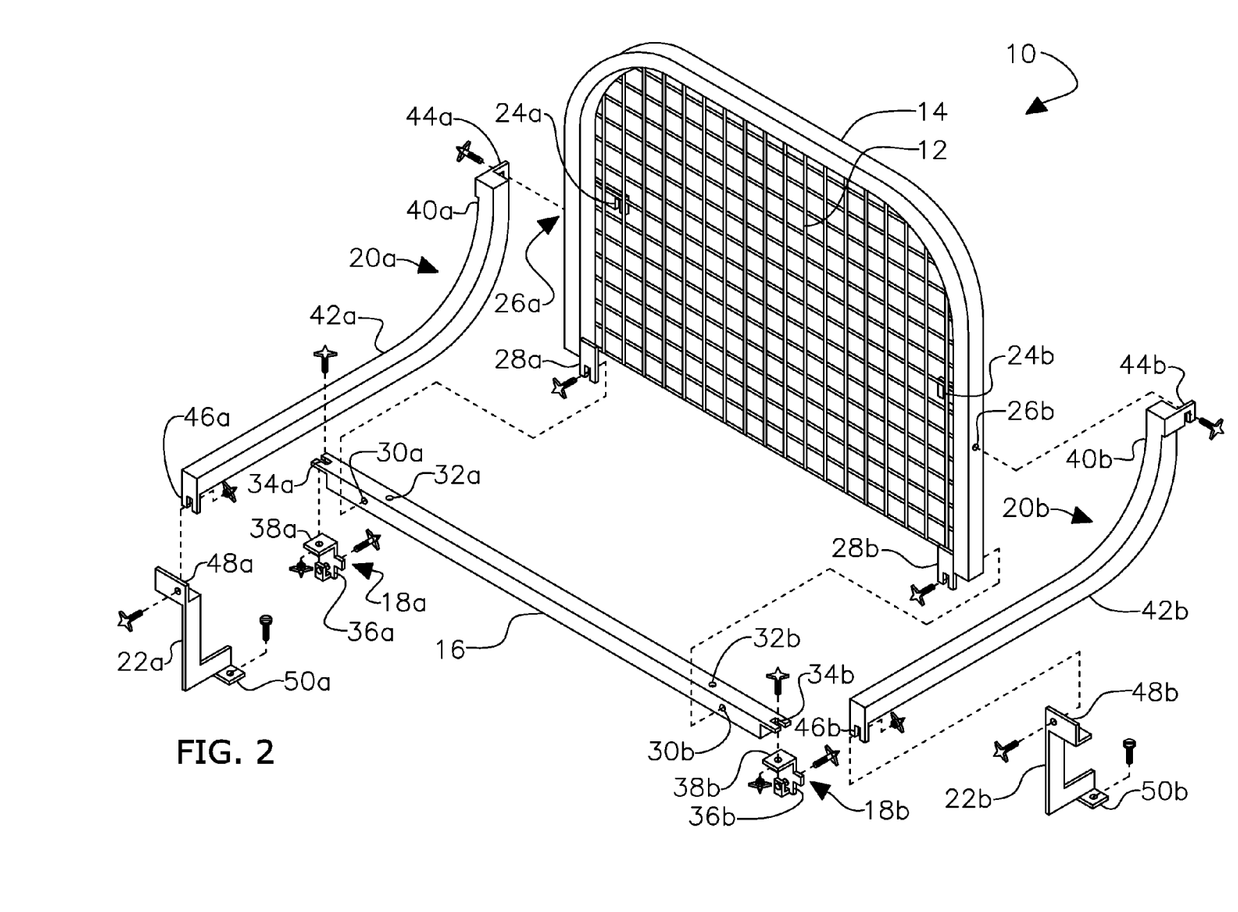
FIG. 2 is an exploded view of the cargo barrier of FIG. 1.
Figure 5:
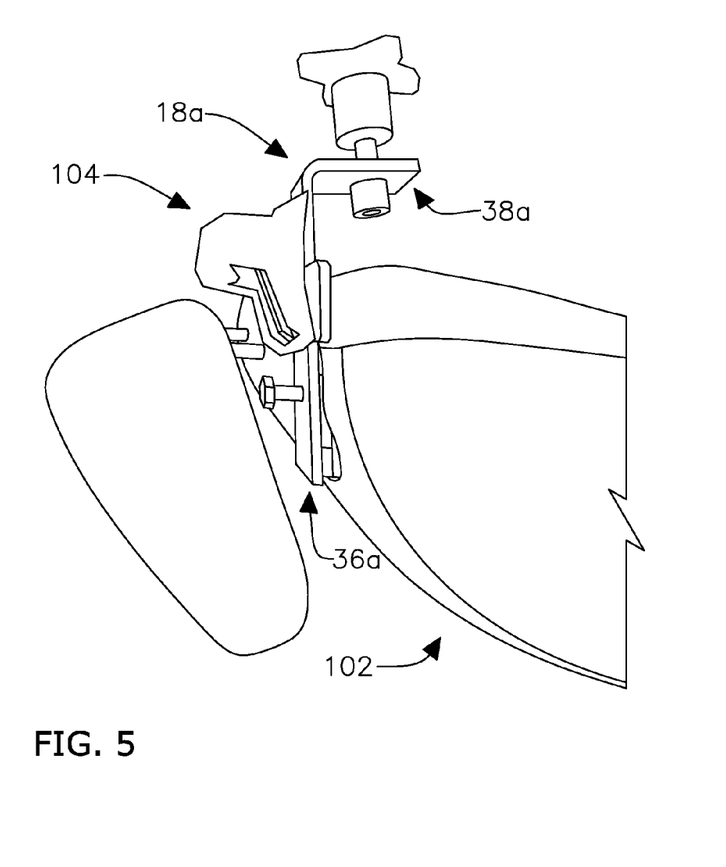
FIG. 5 is a close-up elevation view of a seat mounting bracket connected to a rear seat with the rear seat in a downward position.
Figure 7:
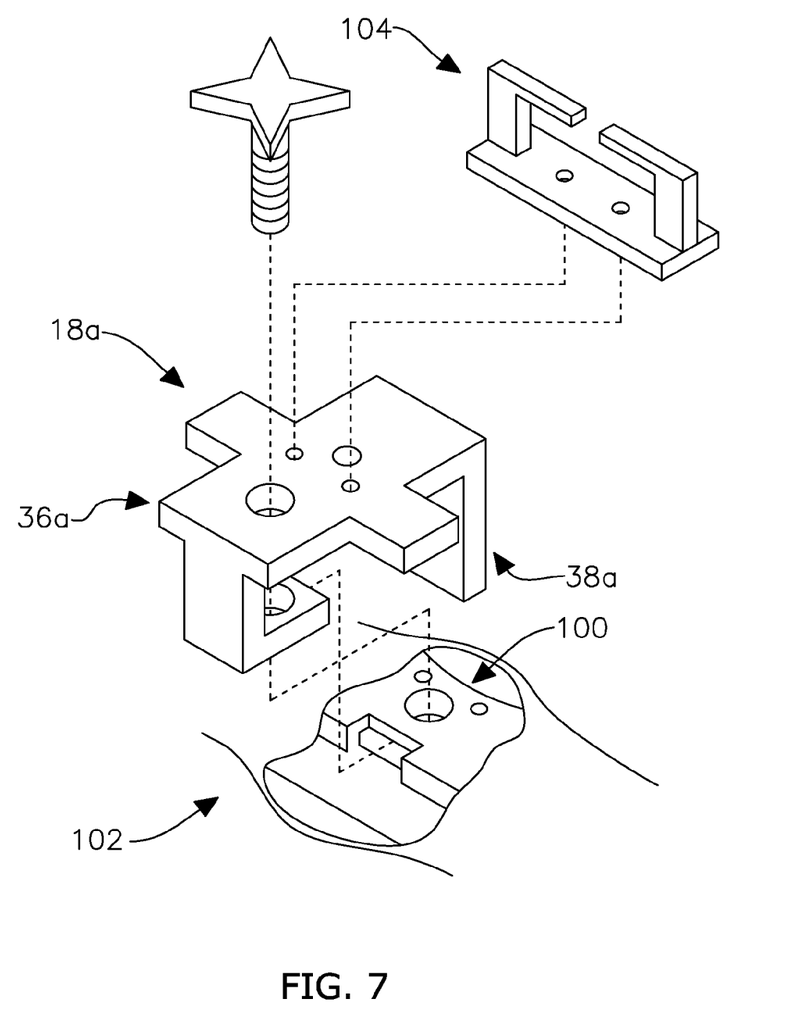
FIG. 7 is an exploded view of the seat mounting bracket of FIG. 5 and the seat mounting point of the rear seat.

In the full cargo configuration, the cargo barrier 10 is mounted directly behind the driver and the front passenger seats with the rear passenger seats 102 folded forward and down. Specifically, the left and right seat mounting brackets 18a,b are connected to seatbelt guide mounting points 100 (which are positioned at the front of the floor of the cargo area in the full cargo configuration) at the left and right seat mounting bosses 36a,b via fasteners (FIG. 5). This is achieved by removing the seatbelt guides 104 from the seatbelt guide mounting points 100, placing the left and right seat mounting brackets 18a,b between the seatbelt guides 104 and the seatbelt guide mounting points 100, and then reinserting the original seatbelt guide fasteners or other fasteners through the seatbelt guides 104 and the seat mounting bosses 36a,b (FIG. 7). In this way, the cargo barrier 10 may be installed with the seatbelt guides 104 securely mounted to the rear passenger seats 102. The left and right lower mounting bosses 28a,b of the guard frame 14 are connected to the first set of mounting bosses 30a,b of the elongated connector member 16 via fasteners with the elongated connector member 16 positioned along a lower end of the guard frame 14, as shown in FIGS. 1 and 2. The third set of mounting bosses 34a,b of the elongated connector member 16 are connected to the left and right connector mounting bosses 38a,b of the left and right seat mounting brackets 18a,b via fasteners, thus securing the guard frame 14 to the rear passenger seats 102 with the cargo guard 12 and the guard frame 14 extending vertically behind the driver and the front passenger seats. The left and right lower mounting brackets 22a,b are connected to sub-floor mounting points at their left and right lower mounting bosses 50a,b via fasteners. Portions of the cargo area floor board or sub-floor foam inserts may need to be cut out or removed for mounting the lower mounting brackets 22a,b to the sub-floor. The left and right mounting bosses 44a,b on the vertical portions 40a,b of the lower extension legs 20a,b are connected to the left and right middle mounting bosses 26a,b of the guard frame 14 via fasteners, as shown in FIGS. 1 and 2. The left and right mounting bosses 46a,b of the horizontal portions 42a,b of the left and right lower extension legs 20a,b are connected to the left and right upper mounting bosses 48a,b of the lower mounting brackets 22a,b via fasteners, thus constructing an assembled cargo barrier 10 anchored at four points.

Figure 3:
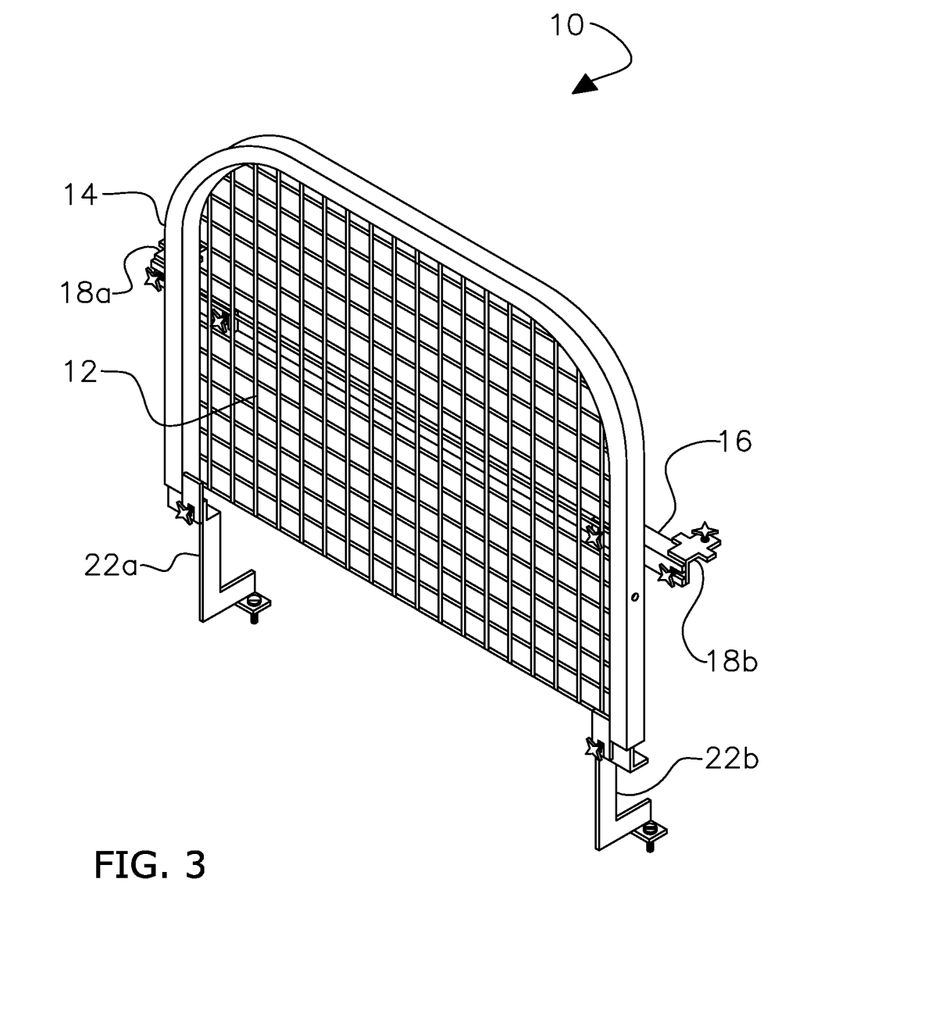
FIG. 3 is a perspective view of the cargo barrier of FIG. 1 assembled in a full passenger configuration.
Figure 4:
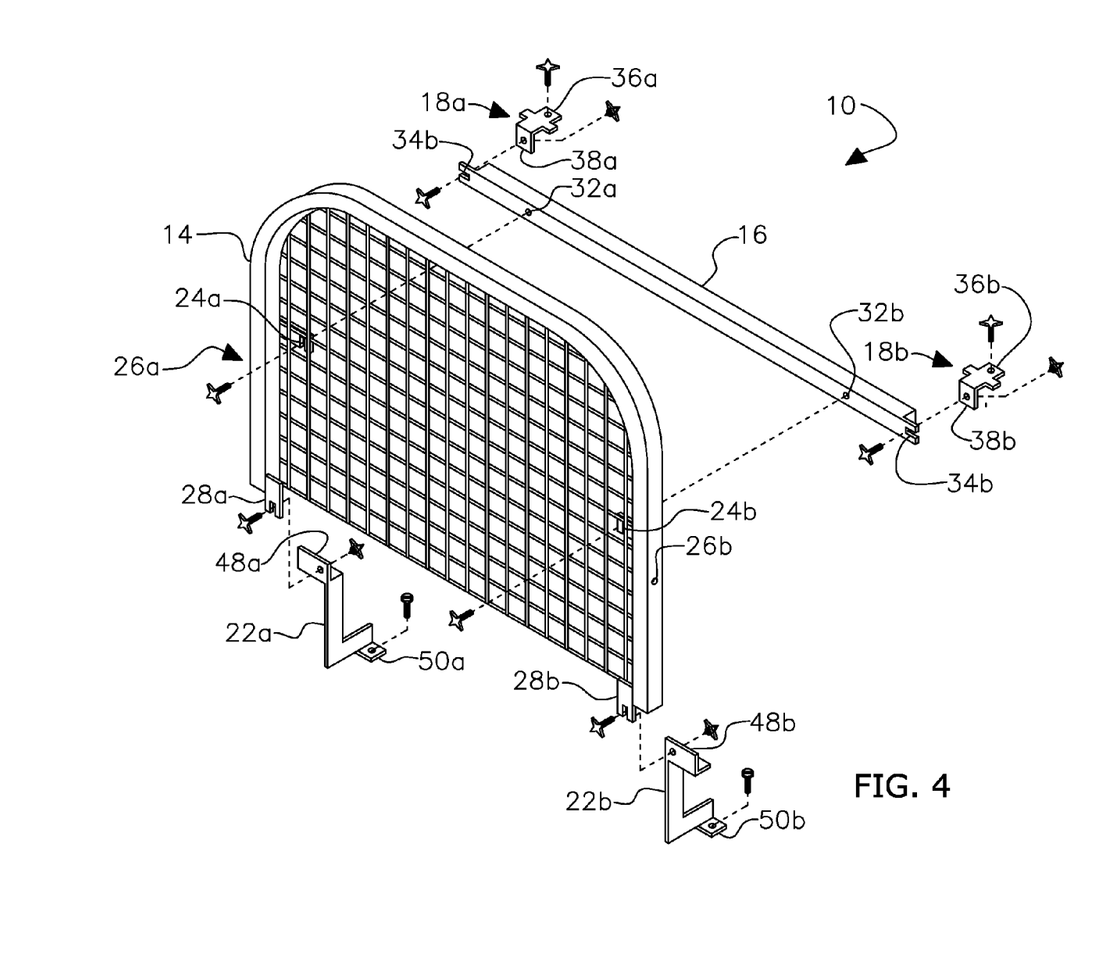
FIG. 4 is an exploded view of the cargo barrier as assembled in FIG. 3.
Figure 6:
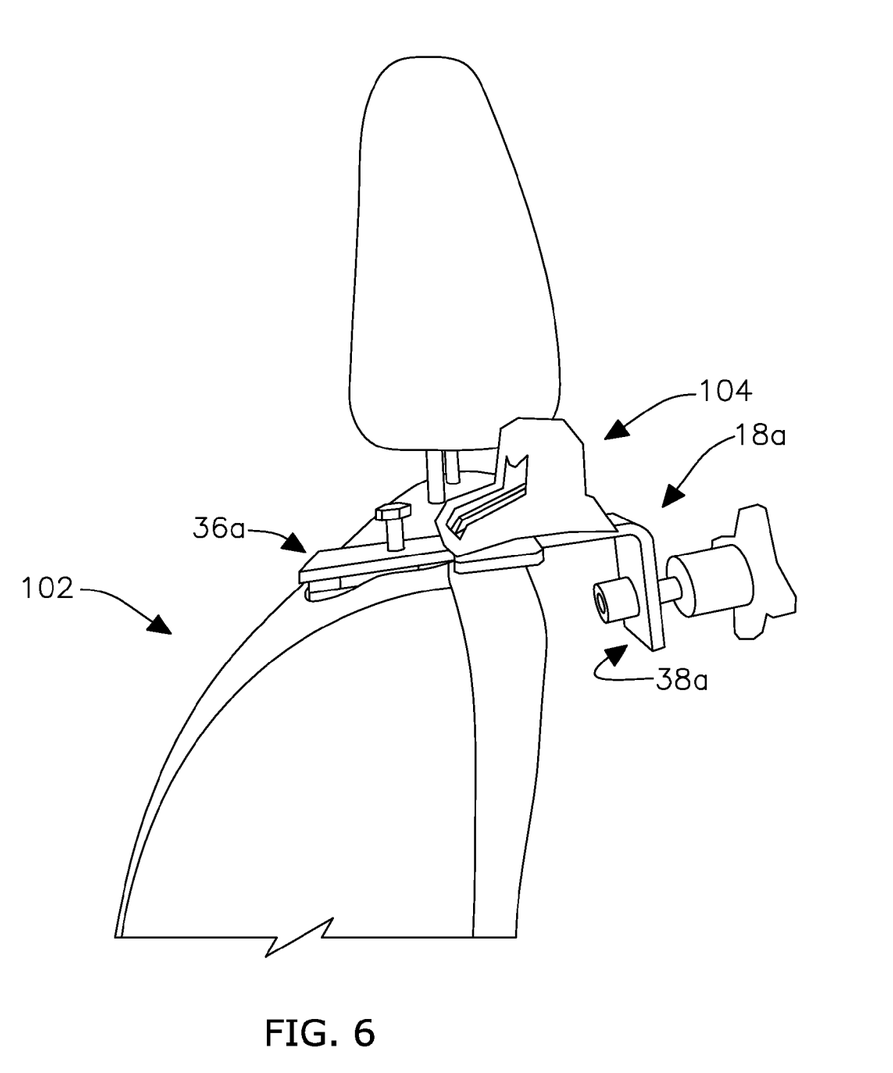
FIG. 6 is a close-up elevation view of the seat mounting bracket of FIG. 5 connected to the rear seat in an upright position.

In the full passenger configuration, the cargo barrier 10 is mounted directly behind the rear passenger seats 102 with the rear passenger seats 102 in their upright positions (FIG. 6). Specifically, the lower mounting bosses 28a,b of the guard frame 14 are connected to the upper mounting bosses 48a,b of the lower mounting brackets 22a,b via fasteners, as shown in FIGS. 3 and 4. The second set of mounting bosses 32a,b of the elongated connector member 16 are connected to the upper mounting bosses 24a,b of the guard frame 14, with the elongated connector member 16 extending horizontally at shoulder height behind the rear passenger seats 102. The third set of mounting bosses 34a,b of the elongated connector member 16 are connected to the connector mounting bosses 38a,b of the left and right seat mounting brackets 18a,b (which are located at shoulder positions of the rear passenger seats when the rear passenger seats are in their upright positions), thus constructing an assembled cargo barrier 10 anchored at four points. The left and right lower extension legs 20a,b are stored in a convenient location such as under the cargo area floor board near the spare tire of the vehicle.

The cargo barrier 10 thus may be used when the full cargo capacity of the vehicle is being utilized and when the full passenger capacity of the vehicle is being utilized.

The cargo barrier 10 may be easily shifted between the full cargo configuration (FIGS. 1, 2, and 5) and the full passenger configuration (FIGS. 3, 4, and 6) and may be easily dismantled and stored or substantially or completely removed from the vehicle. Specifically, shifting the cargo barrier 10 between the full cargo configuration and the full passenger configuration is achieved by loosening or removing the fasteners connecting the guard frame 14 to the elongated connector member 16 and the elongated connector member 16 to the seat mounting brackets 18a,b, loosening or removing the fasteners connecting the guard frame 14 to the lower extension legs 20a,b and the lower extension legs 20a,b to the lower mounting brackets 22a,b, and then reconnecting the fasteners as described above. This process is even easier and does not require tools if the fasteners are hand tightening knob fasteners, clamps, clips, or pins. In this way, the cargo barrier 10 may be reconfigured without disconnecting the seat mounting brackets 18a,b from the seat mounting points 100 and without disconnecting the lower mounting brackets 22a,b from the sub-floor mounting points, which saves a lot of uninstallation and installation time and effort.

The cargo barrier 10 may also be easily dismantled and stored or removed from the vehicle when it is not needed. Specifically, the cargo guard 12, the guard frame 14, the elongated connector member 16 and the lower extension legs 20a,b may be easily disconnected from the seat mounting brackets 18a,b and the lower mounting brackets 22a,b without removing the seat mounting brackets 18a,b and the lower mounting brackets 22a,b from the vehicle by loosening or removing the respective fasteners connecting them the respective components together, which saves a lot of uninstallation and installation time and effort. Reinstalling the cargo barrier 10 is achieved by reconnecting the cargo guard 12 and the guard frame 14, the elongated connector member 16, and the lower extension legs 20a,b (in the full cargo configuration) to the seat mounting brackets 18a,b and the lower mounting brackets 22a,b, as described above.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A cargo barrier for use in a vehicle, the cargo barrier comprising:
    a substantially vertically extending, cargo guard including a guard frame disposed substantially around outer extents of the cargo guard;
    at least one seat mounting bracket configured to be connected to a rear passenger seat of the vehicle;
    at least one extension leg; and
    at least one lower mounting bracket configured to be connected to a mounting point near a floor of the vehicle,
    the cargo barrier being configured for mounting in a cargo area of the vehicle in a first configuration in which rear passenger seats of the vehicle are folded forward and downward, a lower portion of the guard frame is connected to the seat mounting bracket, and the extension leg is connected to the guard frame and the lower mounting bracket and a second configuration in which the rear passenger seats are in upright positions, an upper portion of the guard frame is connected to the seat mounting bracket, and a lower portion of the guard frame is connected to the lower mounting bracket.

2. The cargo barrier of claim 1, wherein the cargo barrier comprises two seat mounting brackets, two extension legs, and two lower mounting brackets, and the cargo barrier is configured for mounting in a cargo area of the vehicle in the first configuration in which lower portions of the guard frame are connected to the seat mounting brackets, and the extension legs are connected to the guard frame and to the lower mounting brackets and the second configuration in which upper portions of the guard frame are connected to the seat mounting brackets, and lower portions of the guard frame are connected to the lower mounting brackets.

3. The cargo barrier of claim 2, wherein the two seat mounting brackets are configured to be connected to a seatbelt guide mounting point of a rear passenger seat with a seatbelt guide of the rear passenger seat being mounted to the seatbelt guide mounting point.

4. The cargo barrier of claim 2, wherein the two extension legs each include a substantially vertically extending portion and a substantially horizontally extending portion, and the vertically extending portion is configured to be connected to a middle portion of the guard frame and the horizontal portion is configured to be connected to one of the lower mounting brackets.

5. The cargo barrier of claim 4, wherein the substantially horizontally extending portion has a length greater than a height of the vertically extending portion.

6. The cargo barrier of claim 4, wherein the two extension legs each have a bend with an inside radius of at least 2 inches between the substantially horizontally extending portion and the vertically extending portion.

7. The cargo barrier of claim 2, wherein the cargo guard includes at least two upper mounting bosses, at least two middle mounting bosses, and at least two lower mounting bosses, the two seat mounting brackets each include a mounting boss, the two extension legs each include a first and a second mounting boss, and the two lower mounting brackets each include a mounting boss, and the two lower mounting bosses of the cargo guard are configured for connecting to the mounting bosses of the seat mounting brackets, the first mounting bosses of the extension legs are configured for connecting to the two middle mounting bosses of the cargo guard, and the second mounting bosses of the extension legs are configured for connecting to the mounting bosses of the lower mounting brackets when the cargo barrier is in the first configuration, and the two upper mounting bosses of the cargo guard are configured for connecting to the mounting bosses of the seat mounting brackets and the two lower mounting bosses of the cargo guard are configured for connecting to the mounting bosses of the lower mounting brackets when the cargo barrier is in the second configuration.

8. The cargo barrier of claim 7, wherein the two middle mounting bosses of the cargo guard each defines a threaded hole.

9. The cargo barrier of claim 7, wherein the two middle mounting bosses of the cargo guard each extends into the guard frame from an outside surface of the guard frame.

10. The cargo barrier of claim 7, wherein the two upper mounting bosses of the cargo guard each are tabs.

11. The cargo barrier of claim 7, wherein the two upper mounting bosses of the cargo guard each define a hole for receiving a fastener therethrough.

12. The cargo barrier of claim 7, wherein the two lower mounting bosses of the cargo guard each are tabs.

13. The cargo barrier of claim 7, wherein the two lower mounting bosses of the cargo guard each define an open-ended slot for receiving a fastener therethrough.

14. The cargo barrier of claim 7, wherein the second mounting bosses of the extension legs each are tabs extending downward from the respective extension leg.

15. The cargo barrier of claim 14, wherein the second mounting bosses of the extension legs each define an open-ended slot for receiving a fastener therethrough.

16. The cargo barrier of claim 1, wherein the guard frame includes two curving portions at top left and top right of the guard frame each having an inside radius of at least 2 inches.

17. A cargo barrier for use in a vehicle, the cargo barrier comprising:
a substantially vertically extending cargo guard;
at least one seat mounting bracket configured to be connected to a rear passenger seat of the vehicle;
at least one extension leg; and
at least one lower mounting bracket configured to be connected to a mounting point near a floor of the vehicle,
the cargo barrier being configured for mounting in a cargo area of the vehicle in a first configuration in which rear passenger seats of the vehicle are folded forward and downward, a lower portion of the guard frame is connected to the seat mounting bracket, and the extension leg is connected to the guard frame and the lower mounting bracket and a second configuration in which the rear passenger seats are in upright positions, an upper portion of the guard frame is connected to the seat mounting bracket, and a lower portion of the guard frame is connected to the lower mounting bracket.

18. The cargo barrier of claim 17, wherein the cargo guard includes at least one upper mounting boss, at least one middle mounting boss, and at least one lower mounting boss, the seat mounting brackets include at least one mounting boss, the extension leg includes a first and a second mounting boss, and the lower mounting bracket includes at least one mounting boss, with the lower mounting boss of the cargo guard being configured for connecting to the mounting boss of the seat mounting bracket, the first mounting boss of the extension leg being configured for connecting to the middle mounting boss of the cargo guard, and the second mounting boss of the extension leg being configured for connecting to the mounting boss of the lower mounting bracket when the cargo barrier is in the first configuration, and the upper mounting boss of the cargo guard being configured for connecting to the mounting boss of the seat mounting bracket and the lower mounting boss of the cargo guard being configured for connecting to the mounting boss of the lower mounting bracket when the cargo barrier is in the second configuration.

19. The cargo barrier of claim 1, wherein the guard frame includes two curving portions at top left and top right of the guard frame each having an inside radius of at least 2 inches.

* * * * *